United States Patent
Bonam et al.

(10) Patent No.: US 7,255,364 B2
(45) Date of Patent: Aug. 14, 2007

(54) DRIVER AIR BAG COVER AND ATTACHMENT METHOD

(75) Inventors: Charles R. Bonam, Pontiac, MI (US); Brian C. Ford, Mt. Clemens, MI (US); Eric J. Baumbach, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 262 days.

(21) Appl. No.: 11/066,351

(22) Filed: Feb. 25, 2005

(65) Prior Publication Data

US 2005/0194768 A1   Sep. 8, 2005

Related U.S. Application Data

(60) Provisional application No. 60/550,384, filed on Mar. 5, 2004.

(51) Int. Cl.
B60R 21/16   (2006.01)
(52) U.S. Cl. ...................................... 280/731
(58) Field of Classification Search ............. 280/728.2, 280/731
See application file for complete search history.

(56) References Cited

U.S. PATENT DOCUMENTS

| | | | |
|---|---|---|---|
| 5,505,483 A | 4/1996 | Taguchi et al. | |
| 5,577,768 A | 11/1996 | Taguchi et al. | |
| 5,762,361 A | 6/1998 | Herrmann et al. | |
| 6,029,992 A | 2/2000 | Vendley et al. | |
| 6,565,113 B2 * | 5/2003 | Kassman et al. | 280/728.2 |

* cited by examiner

Primary Examiner—Faye M. Fleming
(74) Attorney, Agent, or Firm—Markell Seitzman

(57) ABSTRACT

An air bag module (20, 20a) comprising: an inflator (300), a first support member (200-200a), a second support member (250, 250a-250d) and a cover (30) for enclosing an air bag (100); the cover includes a plurality of resilient tabs (48), the tabs are situated in a predetermined pattern about a cavity (38) which receives the air bag (100), a formation having a thickened tip is formed on a distal end of each tab, the thickened tip is configured as lock feature (50) which prevents the cover from disengaging from the first and second support members, each tab and associated lock feature is movable from a rest position to a deflected position upon contact with one of the plates; the first and second support members are locatable about each tab and configured to cooperatively define an effective narrow opening which is of smaller dimension than the thick tip, thereby preventing movement of the thick tip through the first and second support members and hence the disengagement of the cover from the first and second support members.

21 Claims, 10 Drawing Sheets

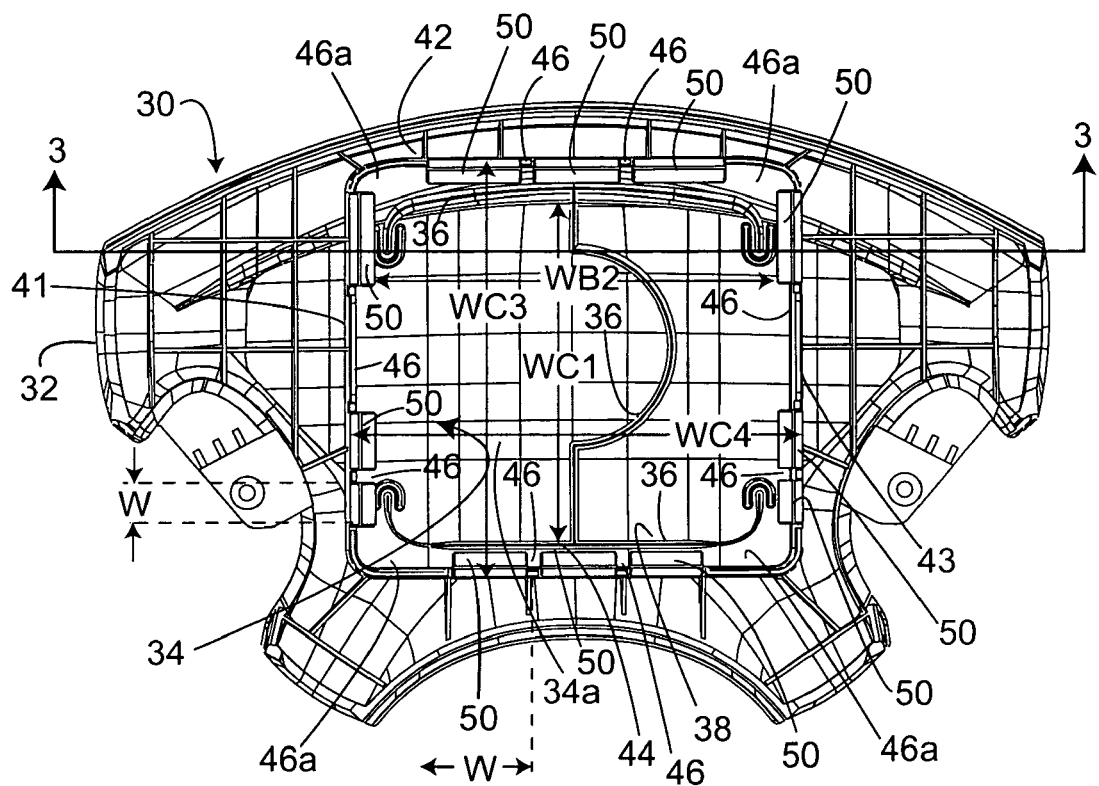
Fig. 2
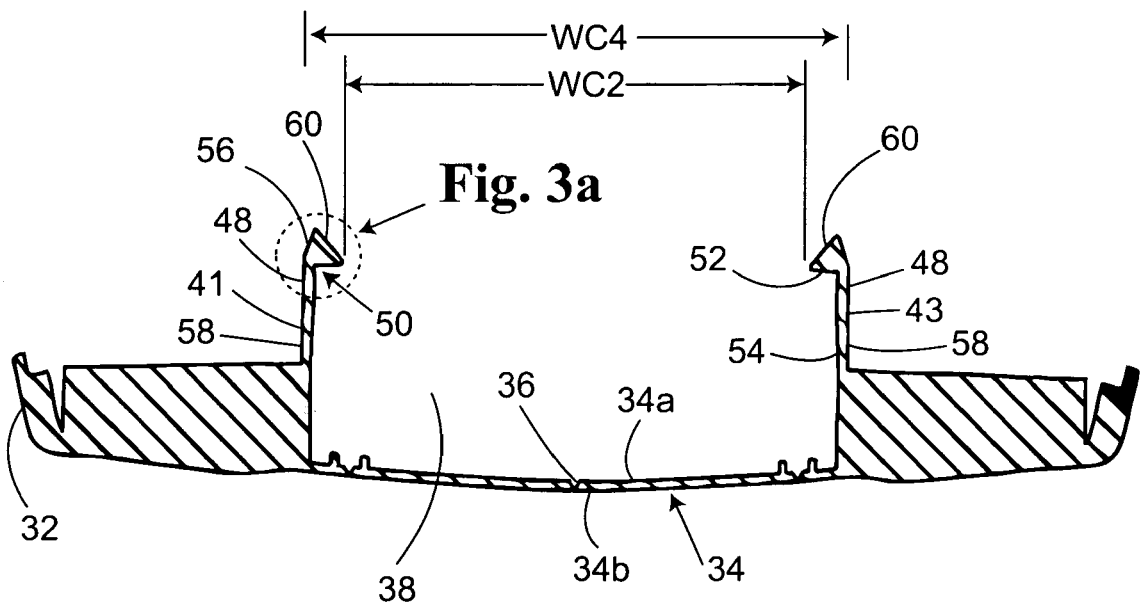
Fig. 3a
Fig. 3

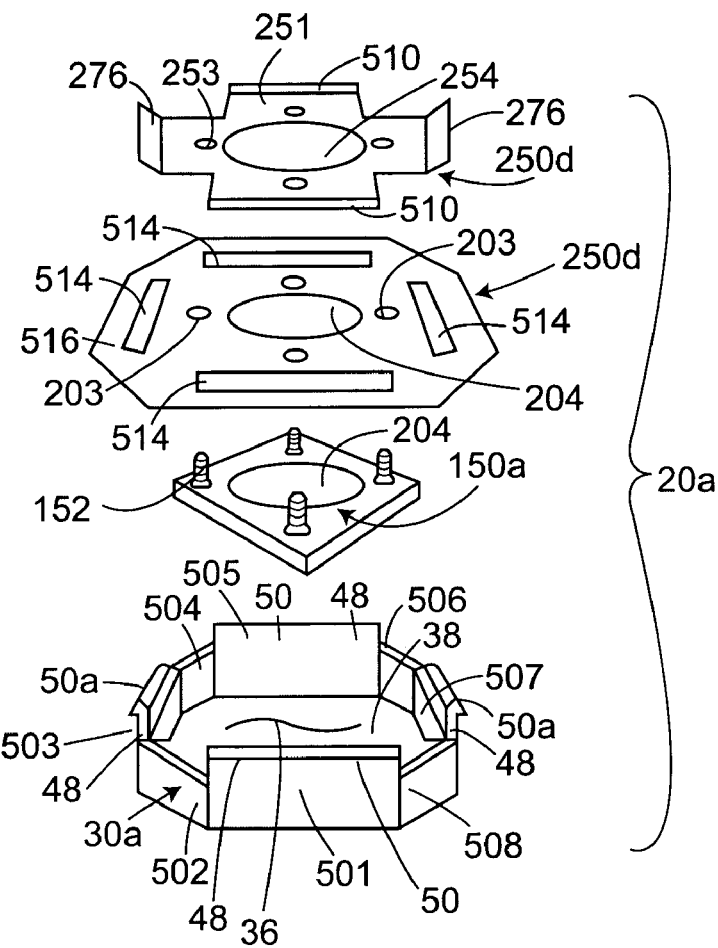
Fig. 17
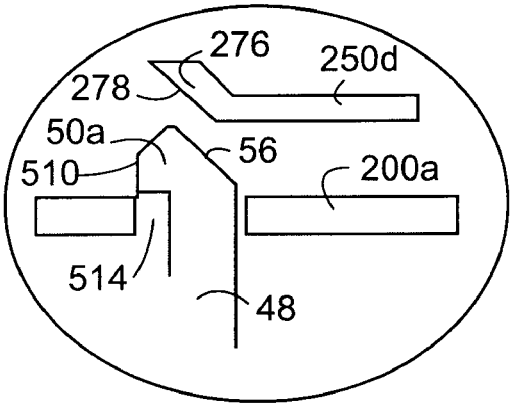
Fig. 18
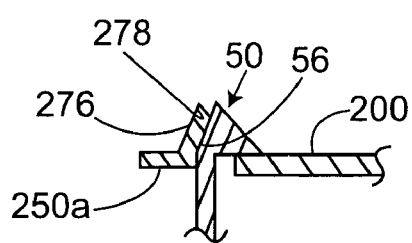
Fig. 16
Fig. 19

DRIVER AIR BAG COVER AND ATTACHMENT METHOD

This application claims the benefit of U.S. Provisional Application No. 60/550,384, filed on Mar. 5, 2004. The disclosure of the above application is incorporated herein by reference.

BACKGROUND AND SUMMARY OF THE INVENTION

The present invention relates to air bag modules and more particularly to an air bag module in which the air bag cover is attached to a housing or support member without the need for additional discrete fasteners.

The prior art shows air bag modules in which a housing or support plate is secured to a cover by way of rivets or other similar discrete fasteners. Another type of air bag module introduces a snap-fit connection between the housing and cover. In this type of module the air bag cover typically includes a plurality of deformable members, each of which is urged outwardly upon assembly of the housing to the cover to avoid using the discrete fasteners. Upon full insertion of the cover into or upon the housing, these members snap into a locked position.

The present invention provides a novel construction in which a housing or support member such as a support plate or cup-shaped housing is secured to a cooperating cover.

It is an object of the present invention to provide an improved air bag module.

Accordingly the invention comprises: an air bag module comprising: an inflator, a first plate, a second plate and a cover for enclosing an air bag; the cover including a plurality of resilient tabs spaced about the cover, each tab including a lock feature, each tab is movable from a rest position to a deflected position by one of the plates; the first plate operatively connected to the cover and having a plurality of blocking surfaces thereon, each blocking surface positionable adjacent a first side of a corresponding tab; the second plate having a plurality of engagement surfaces thereon for engaging a corresponding cam surface of the lock feature of the tab for deforming the lock feature onto the first plate adjacent the blocking surface, the second plate sandwiching each lock feature between a corresponding engagement surface and the first plate.

Many other objects and purposes of the invention will be clear from the following detailed description of the drawings.

BRIEF DESCRIPTION OF THE DRAWINGS

FIG. 2 is a bottom plan view of an air bag cover.

FIG. 3 is a view taken through section 4-4 of FIG. 2.

FIG. 14 is a plan view of one support member while FIG. 14a is an isometric view of another support member.

FIGS. 15 and 16 show another embodiment of the invention.

FIGS. 17-19 show a further embodiment of the invention.

DETAILED DESCRIPTION OF THE DRAWINGS

Figure 1:
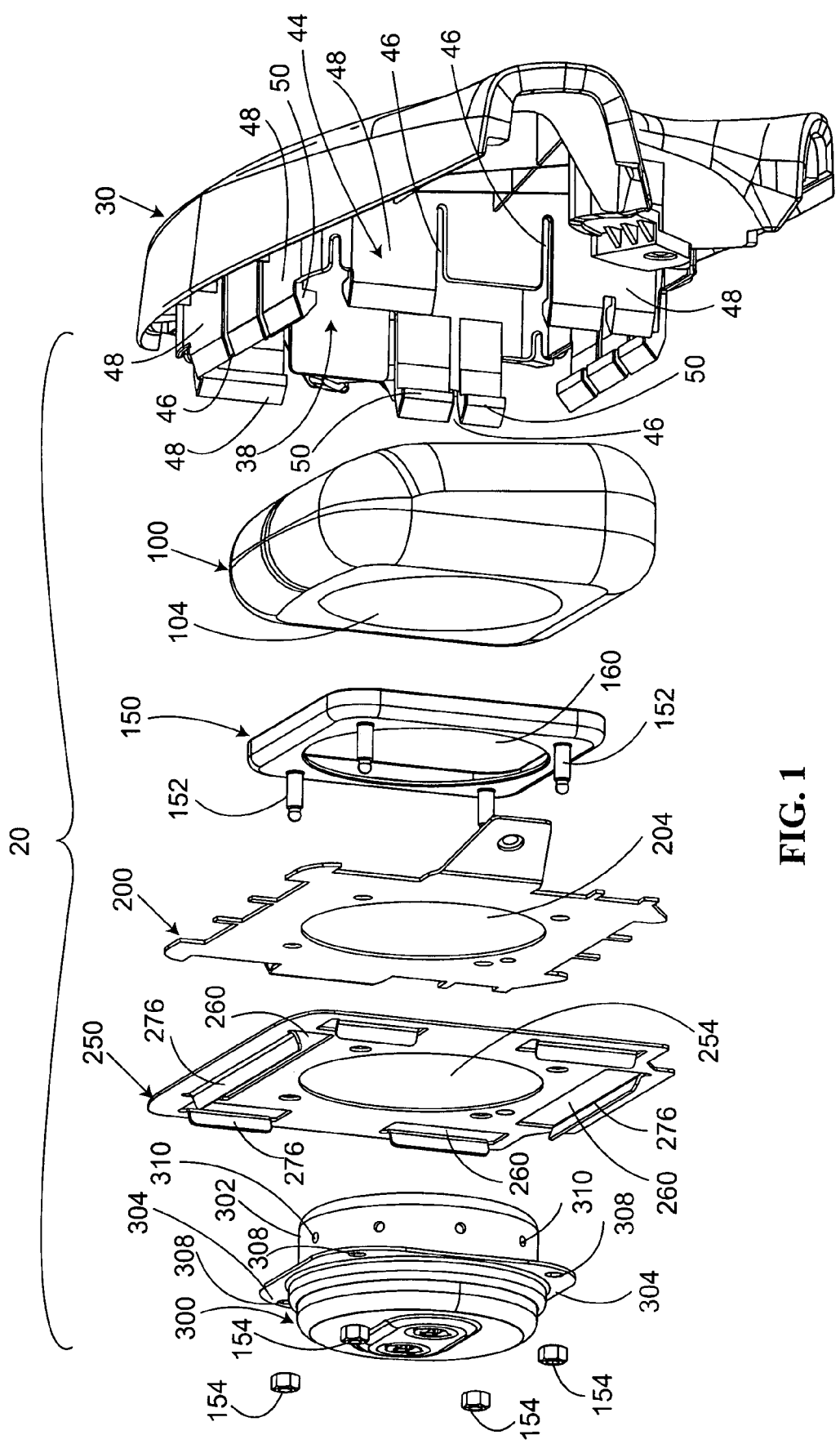
FIG. 1 illustrates an exploded view showing an air bag module incorporating various elements of the present invention.

Reference is made to FIG. 1, which illustrates the major components of an air bag module 20 incorporating various elements of the present invention. These components are: a cover 30, which protectively houses an air bag 100, and a retainer 150, which when assembled, is positioned within the air bag and about an opening in the neck 102 (neck area or region) of the air bag. The retainer includes a plurality of extending threaded studs 152. As will be seen below, these retainer studs 152 extend out of the neck area of the air bag 100 and connect a first or inner support member 200, a second or outer support member 250 and an inflator 300 together. A plurality of fasteners such as nuts 154 secures the above-mentioned components together.

Figure 6:
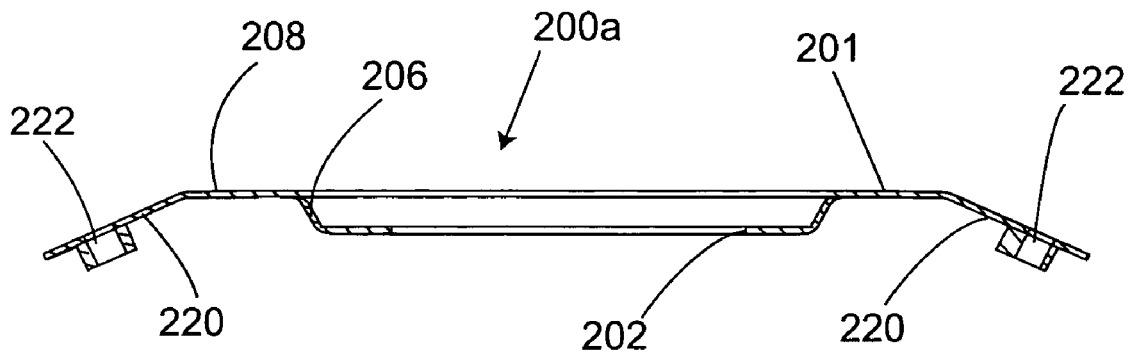
FIG. 6 is a cross-sectional view taken through section 6-6 of FIG. 5.

A version of the first support member 200 is shown in FIG. 1. Each support member is typically made as a metal stamping and certain features thereof may vary. For example, the first support member 200 shown in FIG. 1 has a substantially plate-like appearance but can have a stamped, recessed center as shown in FIG. 6. Similarly, the second or outer plate 250 is representative of the types of plates that can be formed as part of the present invention. For example, the second support member 200, shown in FIG. 1, also has a substantially plate-like appearance but can have a stamped, recessed center that nests with the recessed center of the first support member as shown below. Using members with the recessed centers reduces the overall depth of the module, if desired. The second support member 250 is shown with a plurality of openings 260 and 260a and a plurality of tabs 276 partially covering each opening. In other embodiments the tabs are removed or the number of tabs in relation to the number of openings is varied as also described below.

FIG. 2 is a plan view of the underside of the bottom of the cover 30 and shows additional features thereof. The cover is configured to lockingly engage with and receive one or more support members such as 200 or 200a and 250 or 250a. The cover 30 includes some features that are common to the prior art, such as sides 32, a top 34 and a multi-segment tear seam 36 formed in the underside 34a of the top 34. While not a requirement of the invention, it is recent practice in the air bag industry to use an invisible tear team 36, that is, a tear seam not visible on the outer surface 34b (see FIG. 3) of the top 34 of the cover 30.

The cover is configured to have a generally rectangular cavity 38 for receipt of a folded air bag 100 (diagrammatically shown in FIG. 1). The folded air bag can be placed into the cavity or the air bag can be folded in-situ within the cavity. This cavity 38 is formed by walls 41, 42, 43 and 44, which are formed as a molded integral part or extension of the underside 34a of the air bag cover 30. In the preferred embodiment of the invention the cover is manufactured of a thermoplastic such as nylon, TPO or polyester. Each side or wall 41-44 includes at least one groove, slot or space 46 that separates the wall into a plurality of tabs or sections 48 (also see FIG. 3). In the preferred embodiment these grooves do not extend the entire height of each wall 41-44 (alternatively the grooves could extend the length of the wall). As can be seen in the figures the tabs 48 form the upper portions of each respective wall 41-44 (see FIG. 3). Formed on the distal end of each tab 48 is a respective lock feature 50, which in the illustrated embodiment is formed of a thickened section or thick tip at the end of the tab or tab portion of each wall. In the illustrated embodiment, the general shape of each lock feature for a respective tab is similar and differs only in width. However, various and dissimilar shaped locking-features can be used in the present invention.

Figure 3A:
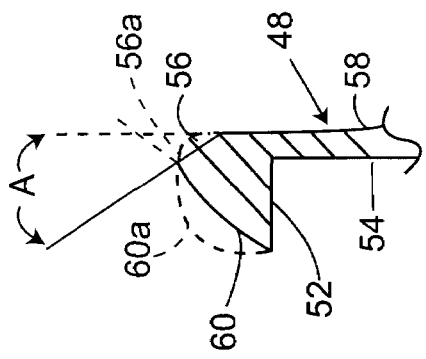
FIG. 3a is an enlarged view of a portion of FIG. 3.

Reference is briefly made to FIG. 3, which is a cross-sectional view of the cover showing the tear seam 36 and a pair of opposing tabs 48 and locking features 50. In the illustrated embodiment the cross-sectional shape of each locking feature is polygonal. Each locking feature 50 includes an engagement surface 52 that extends perpendicularly from an inner wall 54 of a tab 48. Additionally, the locking feature includes a receiving surface 56, which is oriented at angle A relative to an outer side wall 58 of tab 48 (also see FIG. 3a). The inner and outer side walls 54 and 58 of each tab 48 are generally parallel to each other. Each lock feature 50 further includes a connecting surface or crown 60, which links the surfaces 52 and 56. As illustrated in the preferred embodiment, the contour of surfaces 52, 56 and 60 is generally flat. These surfaces, and in particular surfaces 56 and 60, can be arcuate in shape giving each locking feature a bulbous shape, as illustrated by phantom lines 56a and 60a. The mechanical properties of the material used to form the cover and the dimensions (including the width W, see FIG. 2) of each tab 48 are chosen to enable each tab 48 (with its integral locking feature 50) to be pushed radially inward during the installation process, at least in this embodiment.

Figure 4:
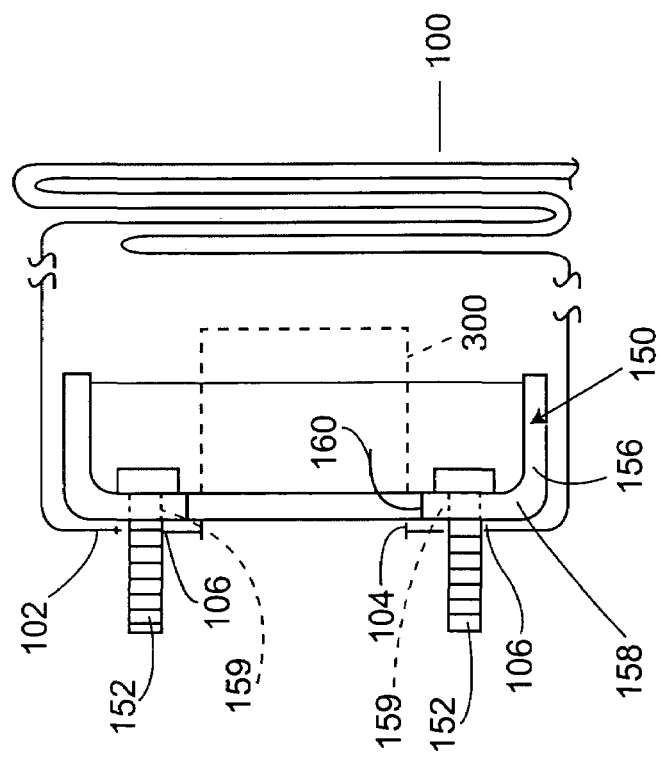
FIG. 4 diagrammatically shows a cross-sectional view of the retainer and air bag.

Reference is briefly made to FIG. 4, which diagrammatically illustrates air bag 100 in a partially folded condition. As previously mentioned, the air bag 100 includes a neck (neck portion or neck region) 102 having an opening or mouth 104. As generally known the inflator 300 is positioned in opening 104 and manipulated so the mounting fasteners 152 extend from a corresponding opening 106 in the air bag 100, located about the center opening 104.

The retainer 150, as shown in FIGS. 1 and 4, is a thin-walled stamping or drawn part having a peripheral wall or side 156 and a bottom 158. The wall can be removed and the retainer can be flat. The bottom 158 includes a large opening 160 through which at least a portion of the inflator 300 is received and four small openings 159. The four threaded fasteners 152 extend into and through a respective one of the openings 106 in the neck of the air bag 100. Opening 160 and opening 104 are about the same size.

Depending upon the particular installation, the air bag 100 can first be folded using any of a number of known techniques to fit within the cavity 38 formed by the walls 41-44. The retainer 150 can subsequently be attached to the neck 102 or, alternatively, the air bag can first be attached to the retainer, the air bag folded and then the combination of the folded air bag with the retainer therein placed within the central cavity 34 on the underside of the cover.

As will be seen from the description below, the retainer and air bag are held to the cover by operation of the support members 200 and 250. The inflator 300 is subsequently mounted to one or the other of the support members 200 or 250 and secured thereto by the nuts 154.

Figure 5:
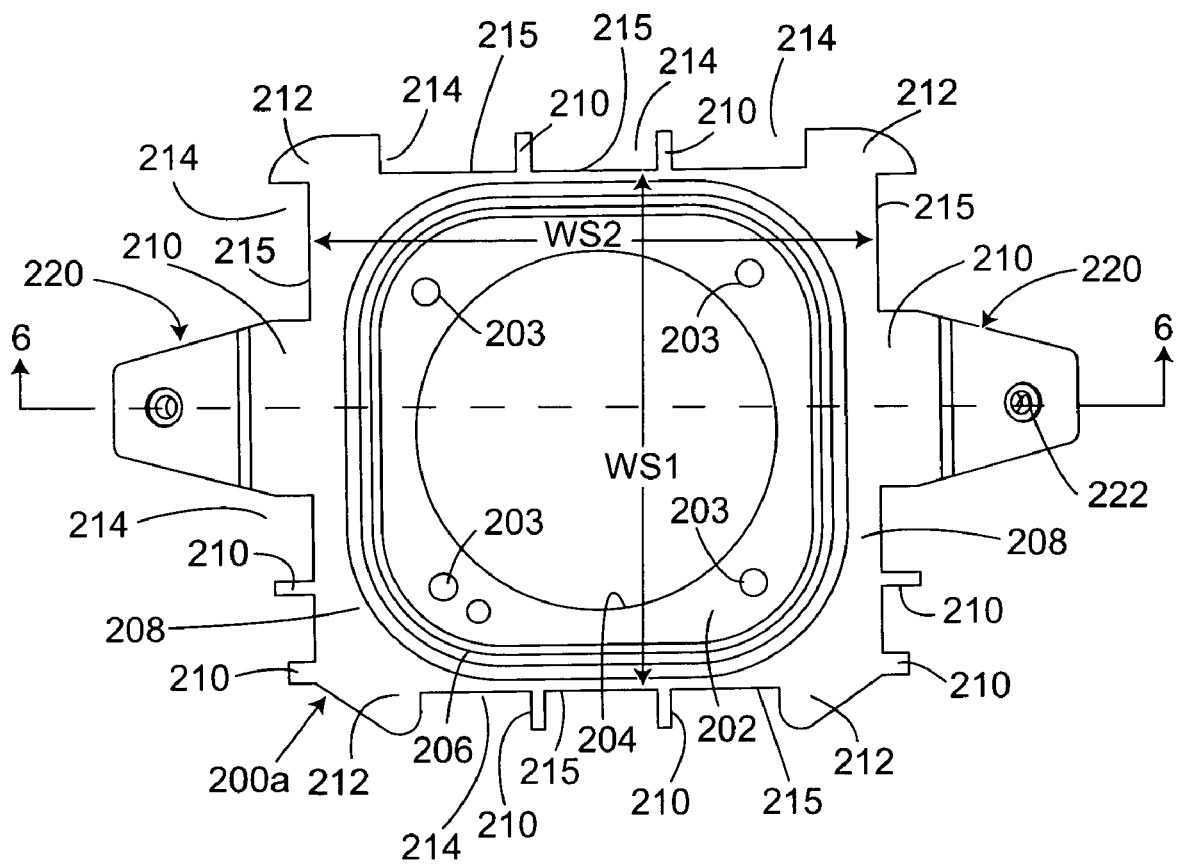
FIG. 5 shows a plan view of a first support member.

FIGS. 5 and 6 illustrate features of the first support member 200a, which is also referred to as an inner housing 200a. The support member 200 is preferably fabricated of stamped steel. In the preferred embodiment the support member 200a is generally plate-like (see numeral 208). As mentioned above, the support member 200a can be planar as shown in FIG. 1 or include a recessed center portion. By way of illustration, the first support member 200a of FIGS. 5 and 6 includes a recessed center portion or a bottom 202 with a circular opening 204 therein giving the support member 200a a more cup-shaped form. The bottom 202 includes a plurality of fastener openings 203, which correspond in number, size and location to the threaded fasteners 152 of the retainer.

Extending upward and radially from the bottom 202 is an inclined, peripheral wall 206, which transitions into a peripheral or upper or plate-like portion 208. The upper portion 208 includes a plurality of axially extending ribs or tabs 210 defining adjacent opening, slots, and apertures 214 therebetween. Each rib 210 is configured to fit within one of the intra-tab grooves or slots 46 of the cover. As can be seen from FIG. 5, the ribs or tabs 210 are generally rectangular in shape. The upper portion 208, however, includes a plurality of corner ribs or projections 212, which fit in the slightly wider corresponding corner grooves or spaces 46a at the corners of the cavity 38 (see FIG. 2) of the cover (formed at the spaces between the respective walls 41-44). The support member 200a additionally includes a plurality of wings 220, which extend oppositely from the upper plate-like portion or surface 208. Each wing includes a bore 222, which is threaded (but can be smooth), to aid attachment of the assembled module to a cooperating part of the steering wheel such as the hub or hub plate. The root or base of each wing 220 functions as a rib 210.

Figure 7:
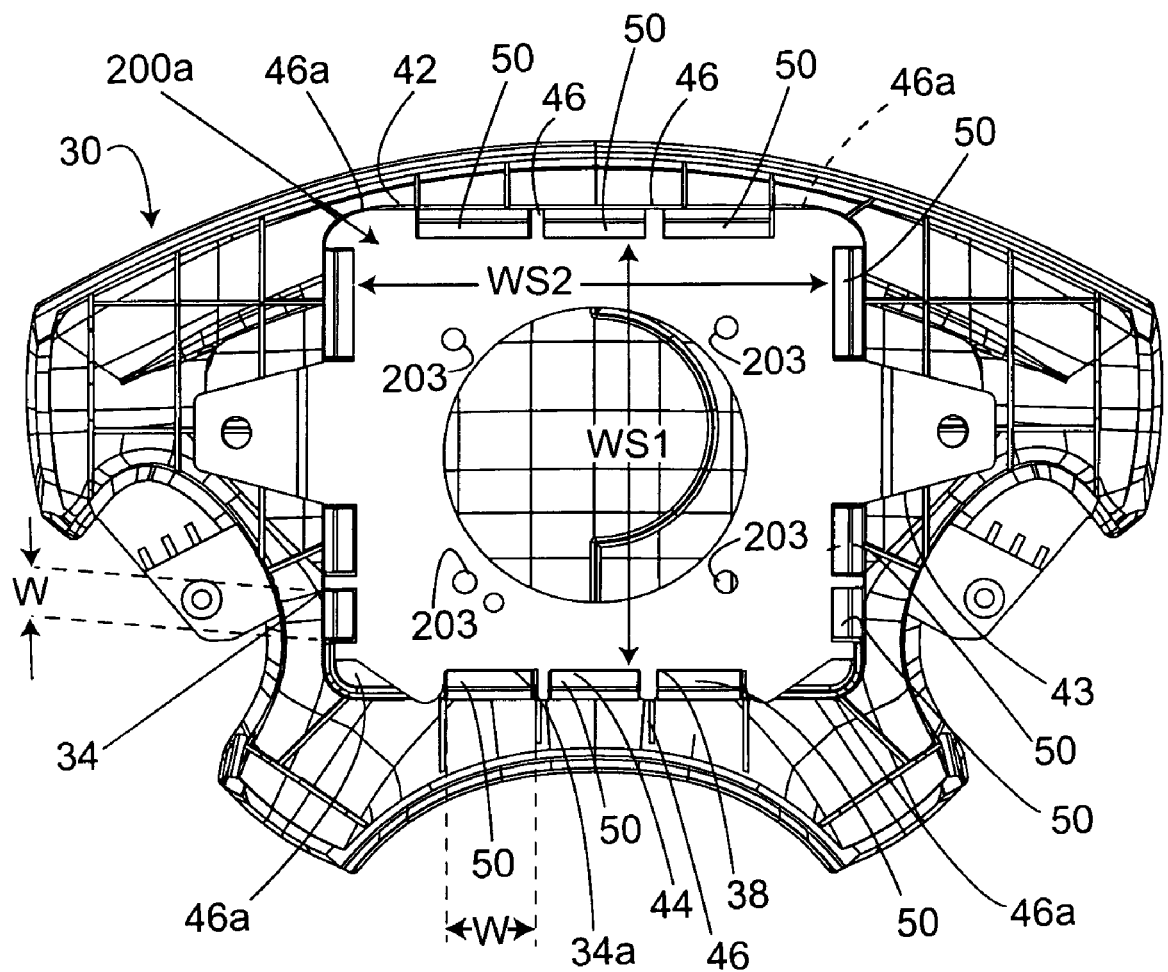
FIG. 7 illustrates an interim step in the assembly of an air bag module.

After the retainer and folded air bag are placed within cavity 38, support member (inner housing) 200a is placed upon the cover 30. The support member 200a is positioned over the cavity 38 and walls 41-44 (with the air bag and retainer previously located in the cavity) and lowered onto the cover such that each leg, rib or projection 210 and 212 fits within a corresponding one of the intra-tab spaces 46 and 46a in the walls 41-44 as shown in FIG. 7. Reference is briefly made to FIGS. 2 and 3, which identify a number of dimensions, such as WC1, WC2, WC3 and WC4. The distances WC1 and WC2 identify the respective distance between inner facing edges of opposing lock members 50, with the lock members in their respective rest or unstressed condition. Reference is again made to FIG. 5, which shows corresponding dimensions WS1 and WS2, which extend between opposing root edges or surfaces 215 of each opening or slot 214. If dimension WS1 is less than WC1 and if dimension WS2 is less than WC2 the center region of the support member 200a can be lowered onto the walls 41-44 of the cover 30 and positioned as described above without deforming any of the locking features 50.

FIG. 7 is a top plan view showing the support member 200a seated on the cover 30. FIG. 3 is a cross-sectional view of the cover 30 and does not include the support member 200 but does shows two opposing undeflected locking members 50, which retain the configuration as shown therein with or without the first support member 200 in place. More particularly, the locking features 50 have not been deflected from their rest position by the introduction of the support member 200.

Figure 8:
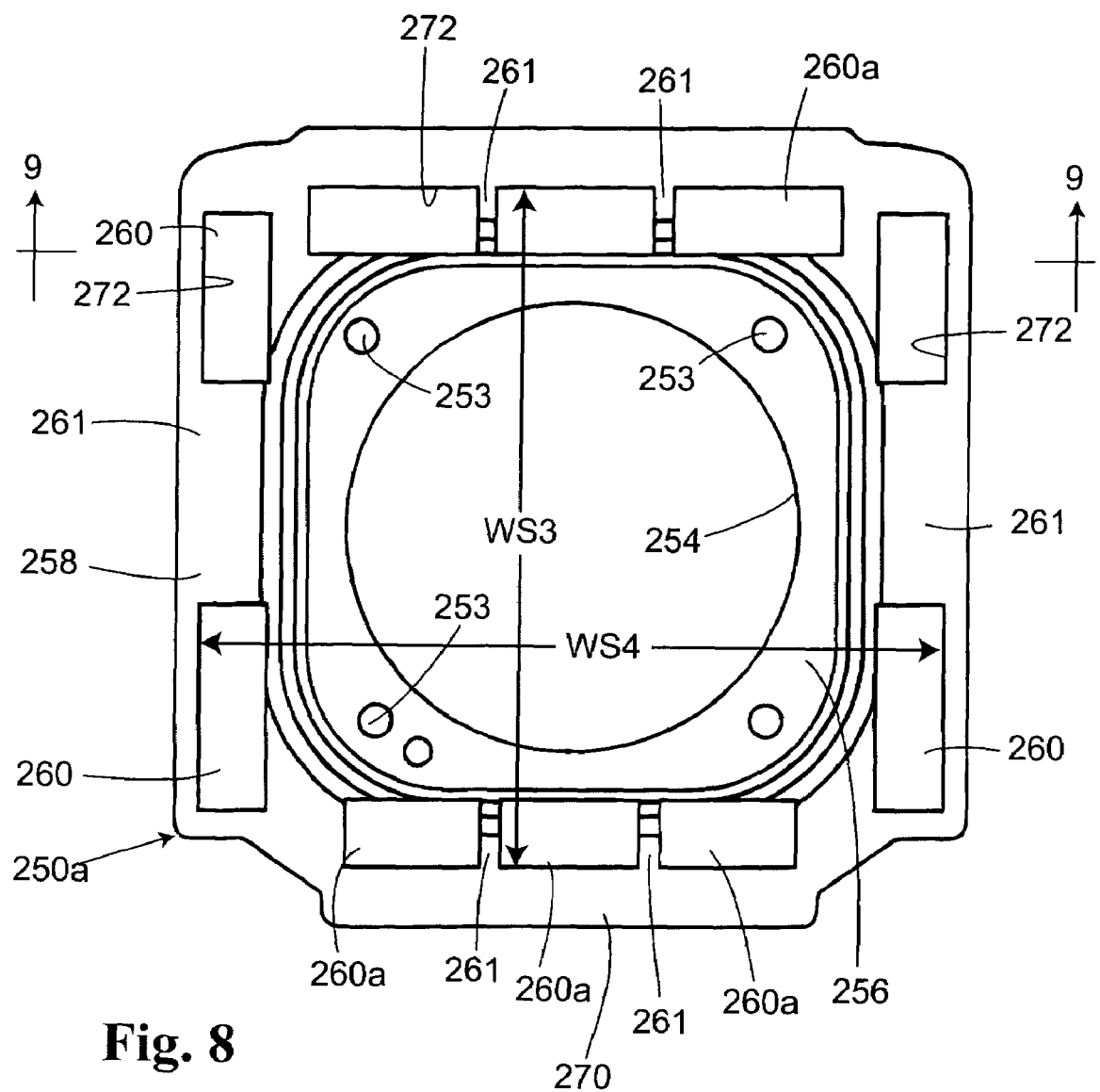
FIGS. 8 and 9 illustrate various views of support member 250.
Figure 9:
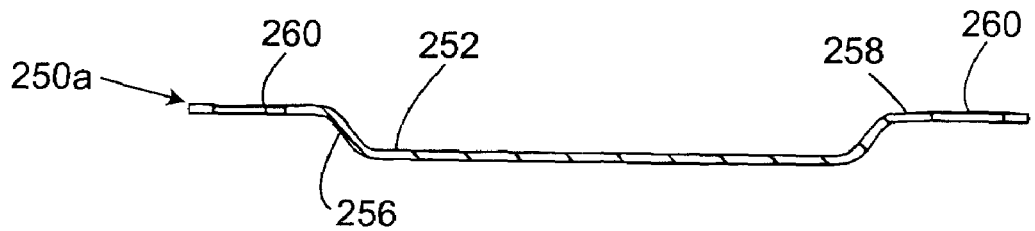

FIG. 8 shows a top plan view of another embodiment of a second or inner support member 250a (also called an outer housing 250a) while FIG. 9 illustrates a cross-sectional view taken through section line 9-9 of FIG. 8. The second support member or housing 250a performs the same general function as second support member 250 of FIG. 1. Member 250a does not include the bent tabs 276. Generally, member 250a is plate-like and can be made from a steel stamping. Member 250a includes a recessed bottom 252 having a central circular opening 254 of the same size as opening 204. The bottom additionally includes a plurality of minor openings 253, which correspond in dimension, shape and location of the fasteners 152.

A radially extending, upwardly disposed wall 256 extends from bottom 252 and transitions into a general outer plate-like portion or outer rim portion 258. The second support member 250a includes a plurality of openings, slots or apertures 260 and 260a, which are formed as part of the outer portion 258 and transition wall 256. The layout of the plurality of openings 260 and 260a in support member 250a corresponds to the geometry of the tabs 48 and lock features 50 of the cover 30. Each of the upper and lower openings 260a is separated by an optional rib or spacer identified by numeral 261. Portions of the rim 258 between the openings 260 function as a rib or spacer as well for openings 260. The plurality of upper and lower openings 260a can be replaced by a larger single opening (see FIG. 14a) in which case the ribs 261 associated with the openings 260a are not used.

During one method of assembly the second support member 250a (or 250) is first lowered onto the first support member 200, which is already in place on the cover 30. The support member 250a (or 250) is oriented so that each opening 260 and 260a, as the case may be, is positioned about a corresponding lock feature 50 (or group of lock features in the case of a large opening 260b of FIG. 14a) with the top or crown 60 of each lock feature 50 extending through a corresponding opening 260 and/or 260a. The support member 250a/250 is subsequently pushed downward upon the lower support member 200. As the second support member 250a is being pushed upon the plurality of locking features 50, the respective outer edge 272 of each opening 260 and 260a engages a corresponding receiving surface 56 of each locking feature 50, pushing the locking feature inwardly to a blocking or locking position in relation to the support member 200. As can be appreciated, the outer edge 272 acts as a cam pushing a receiving surface of the locking feature 50 inwardly. This cam function is accomplished by the tabs 276 in other embodiments of the second support member.

Figure 10:
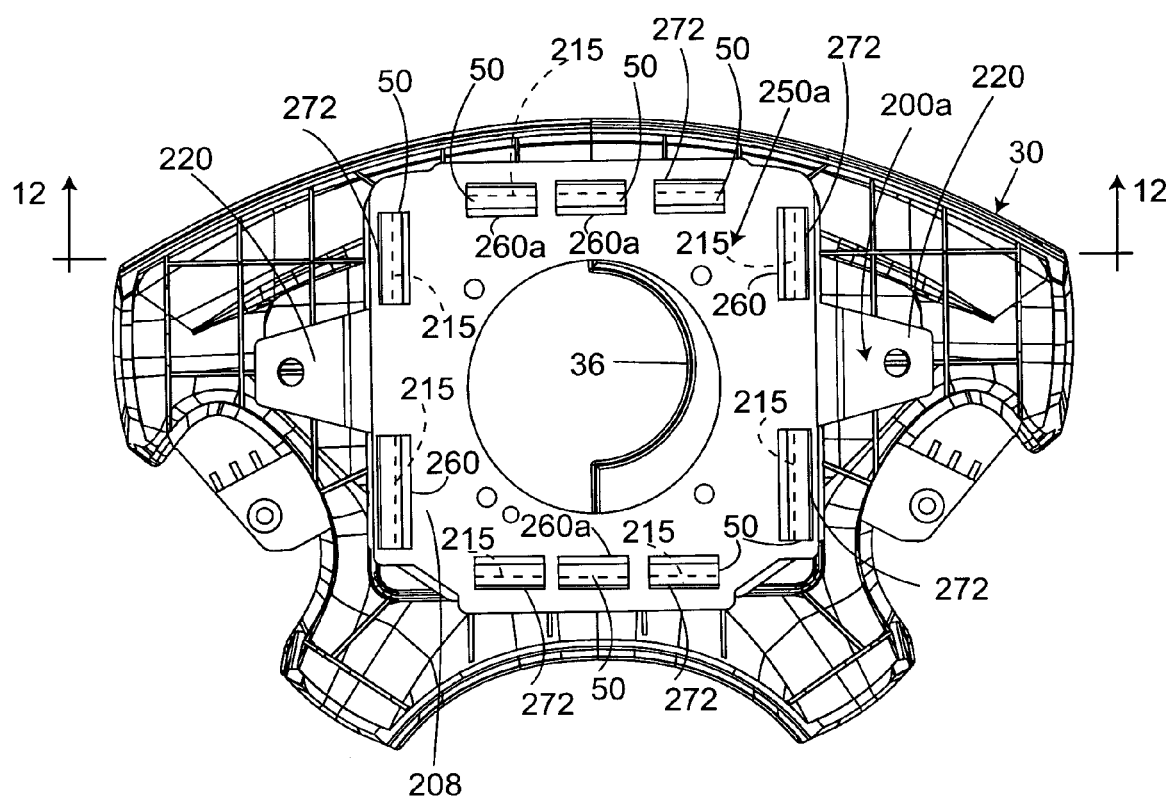
FIGS. 10 and 11 illustrate views of a partially assembled air bag module.

Reference is made to dimensions WS3 and WS4 (see FIG. 8), which represent the diametral distances between outer edges 272 of oppositely positioned openings 260 and 260a. Reference is also made to dimensions WC3 and WC4 shown in FIG. 2. The dimensions WC3 and WC4 are the distances between the outer walls 58 of oppositely positioned tabs 48 and locking features 50 with the tabs and locking features in an unstressed condition. The distances or dimensions WS3 and WS4 are less than corresponding distances or dimensions WC3 and WC4. Because of the foreshortened dimensions of WS3 and WS4 relative to dimensions WC3 and WC4, the downward motion of member 250a places the edges 272 against corresponding receiving surfaces 56 of each locking feature 50, urging the locking features 50 inwardly in comparison to their rest positions illustrated in FIG. 3. This biased, forced and inwardly directed repositioning of the locking features 50 is illustrated in FIG. 10. As the second support feature 250a is mounted to the cover 30 and upon the first support member 200, the engagement surface 52 slides inwardly over a corresponding surface 242 on the top 208 of support member 200.

Figure 11:
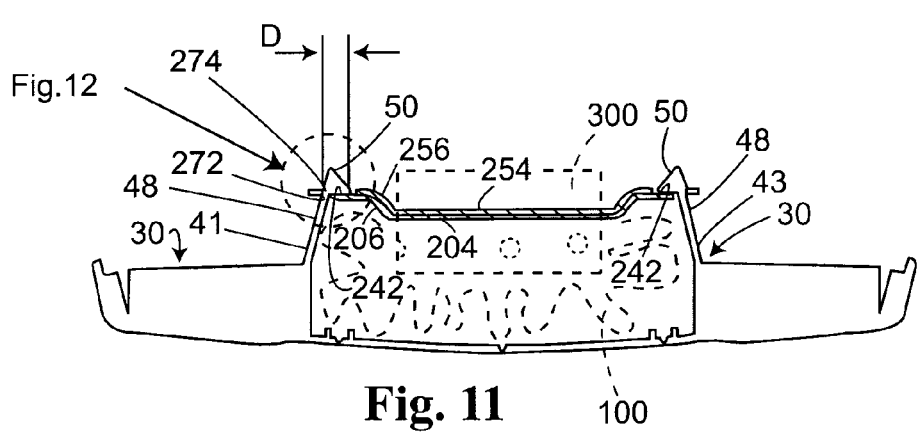

During the mounting of each of the support members 200 and 250a to the cover, the fasteners 152 are positioned so that they extend through the corresponding openings 203 and 253, respectively, in the first and second support members. In this assembled condition, the bottom 204 and wall 206 of the first support member 200 mate or nest with the corresponding bottom 252 and wall 256 of the second support member 250a as shown in FIG. 11. As can be appreciated, if the first and second support members 200 and 250 are flat, they also mate or nest together with corresponding flat surfaces of the other member.

Figure 12:
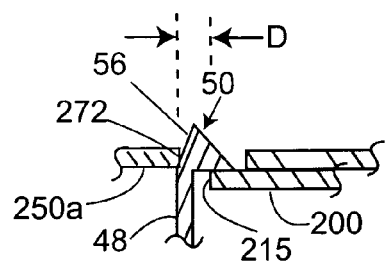
FIG. 12 is an enlarged portion of FIG. 11.

When the second support member 250/250a is in place, it narrows the effective open space 274 about each locking feature 50 as shown in FIG. 12. This effective opening 274 is defined as the distance between outer-inner facing edge 272 of opening 260/260a of member 250a and the root or edge 215 (which functions as a blocking surface) of each slot 214 of member 200. This effective opening 274 is smaller than the depth D, of each locking feature 50, thereby preventing the cover 30 and the locking features 50 from being pulled away from the support members 200, 250 during the deployment of the air bag.

Figure 13:
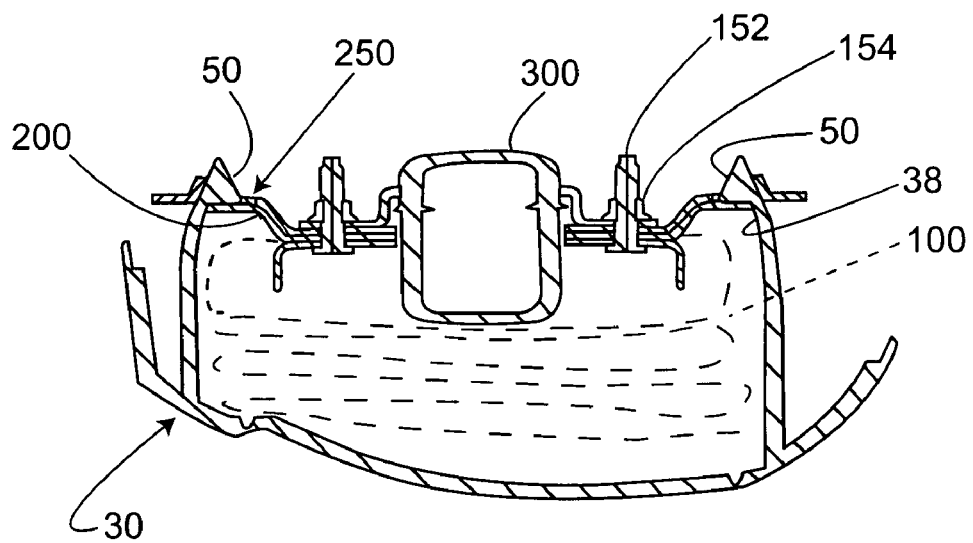
FIG. 13 is a cross-sectional view of an assembled module taken through section 13-13 of FIG. 14b.

Subsequently, the inflator 300 is mounted to the above components. The inflator 300 comprises a general cylindrical body 302 and a radially extending flange 304 having a plurality of mounting openings 308 therein. The inflator is positioned within the concentrically oriented openings 254, 204, 160 of the second support member, first support member and the retaining ring. The inflator body 302 also extends through the central opening 104 of the air bag. The inflator includes a plurality of exit ports 310 through which inflation gas enters into the air bag. The above-mentioned nuts 154 secure the various components together. The final, assembled orientation of the module is shown in FIG. 13, which is a partial sectional view. The inflator includes one or more initiators 301 of known function and type.

It should be appreciated the inflator 300 can be mounted first to the support member 200 and the second support member can then be mounted over the inflator flange 304.

Figure 15:
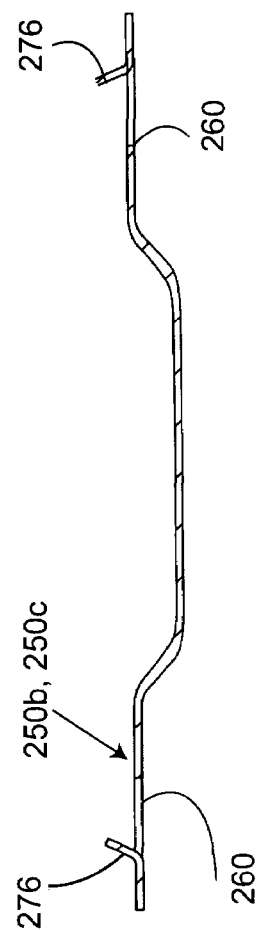
Figure 14:
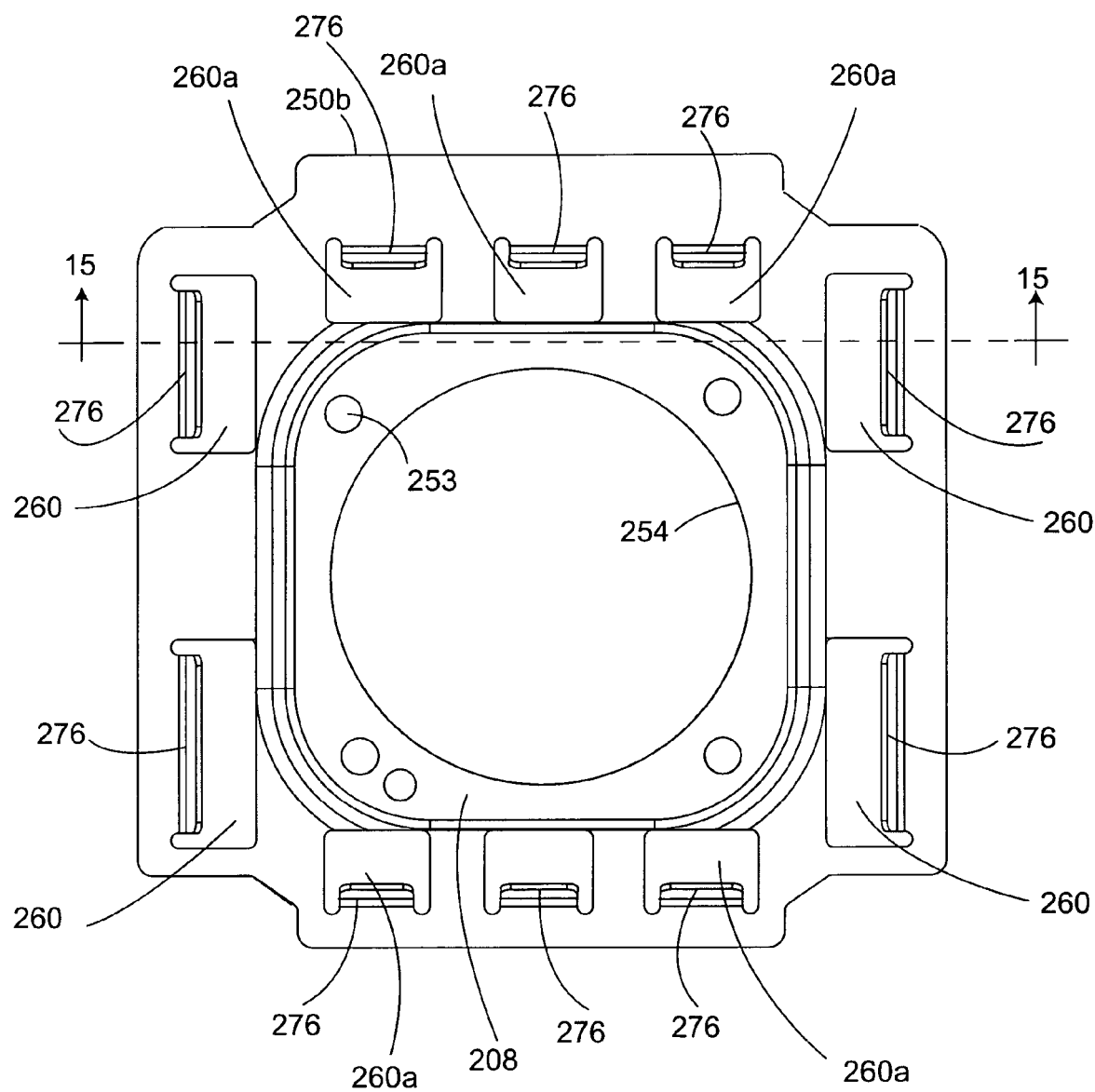
FIGS. 14 and 14a show alternate second support members.
Figure 14A:
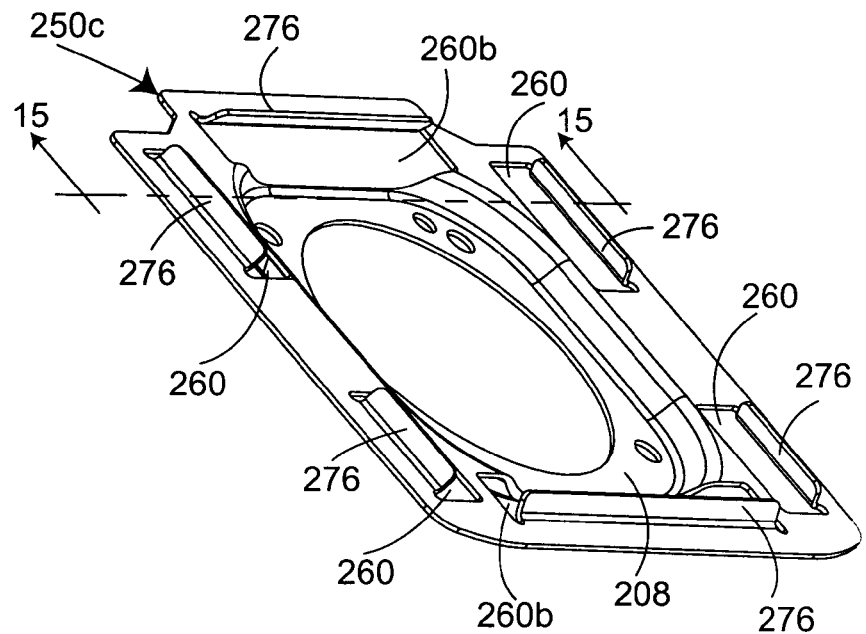

Reference is made to FIGS. 14-16, which show another embodiment of the invention. FIGS. 14 and 14a are functionally similar to the embodiment of FIG. 8. In the alternate embodiment of FIG. 14 the second support member 250b is furnished with a plurality of tabs 276 adjacent each opening 260 and 260a. As can be appreciated the tabs 276 provide an enlarged pushing or cam surface provided by surface or edge 272 in FIG. 8. The tabs 276 are formed during the stamping of the member 250b as material near a side of each opening 260 and 260a (or 260b in FIG. 14a) is bent upwardly to forming the tab. The undersurface 278 of each tab 276 defines an engagement surface, which pushes a corresponding locking member 50 inwardly. The support member 250b is mounted to the cover and support member 200 in the same manner as described for member 250 and 250a. In this embodiment however, the engagement surface 278 forcibly bears upon the receiving surface 56, thereby providing a larger area of contact with the locking feature than achieved in the earlier embodiment.

Figure 14B:
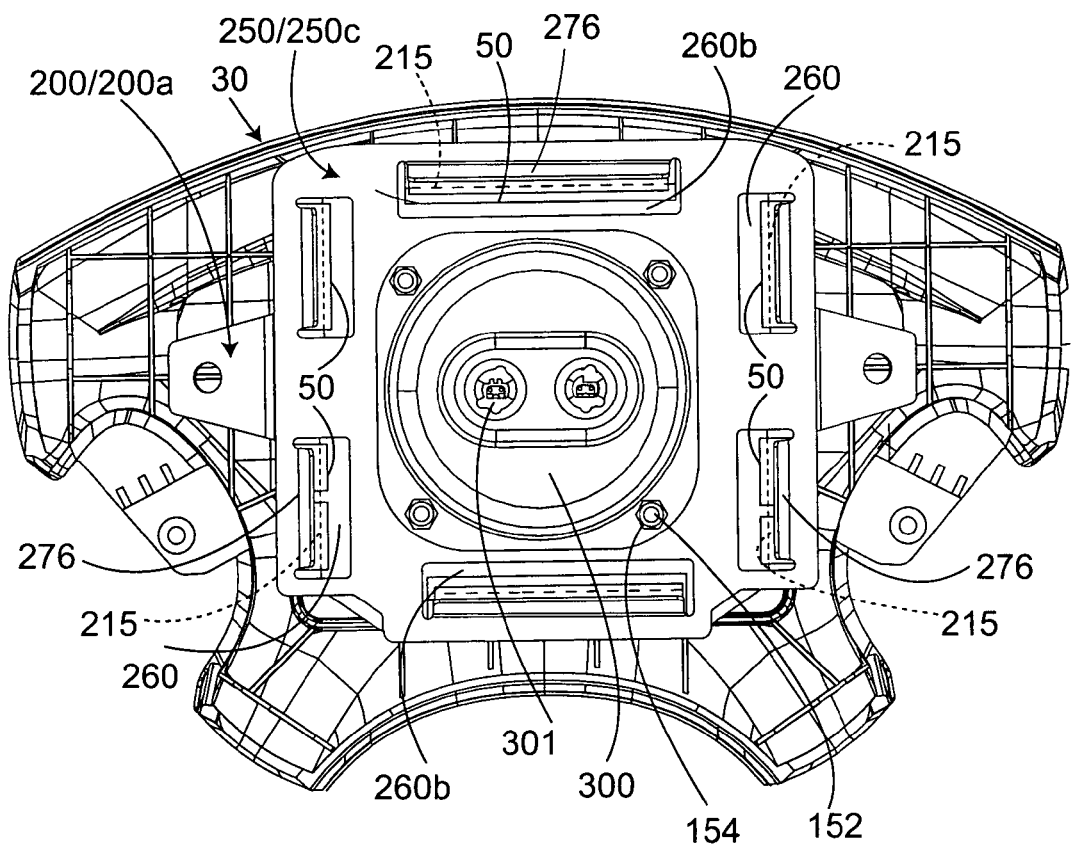
FIG. 14b is a plan view an assembled air bag module.

FIG. 14b is a top view of an assembled module 20a showing first and second support members installed on the cover, and inflator 300 located on the second support member. Reference is briefly made to FIG. 14a, which shows another second support member 250c with tabs 276. The three smaller tabs associated with both sets of openings 260a (in FIG. 14) have been replaced with a single wider tab 276 and the smaller openings 260a replaced by a wider opening 260b. During installation, the various locking members 50 that were individually received within the openings 260a are collectively received in the wider opening 260b. Support member 250c includes a recessed bottom 202 but can be made flat as shown with member 250 of FIG. 1.

Reference is made to FIGS. 17-19, which diagrammatically illustrate an alternate embodiment of the present invention. FIG. 18 shows another driver side module 20a including a cover 30a, air bag, retaining ring 150a, first and second support members 200b and 250d respectively and an inflator. In the previous embodiments the flexible tabs 48 and locking features 50 of cover 30 were deflected inwardly by an edge of an opening in the second or outer support member or by a similarly acting engagement surface 278 of a tab 276. This embodiment reconfigures corresponding parts of the module to permit the cover tabs and locking features to move outwardly upon assembly into locked configuration.

The cavity 38 of cover 30a is octagonally shaped in comparison to the rectangular cavity shown in FIGS. 1 and 2. The cavity as defined by the walls 501-508 includes two sets of opposingly placed locking features 50a. The top portion of walls 501, 503, 505 and 507 functions as the flexible tab 48. In this embodiment only two sets of tabs 48 are used. Locking feature 50a is located at a distal end of tabs 48. Each locking feature 50a is generally similar in shape and function to locking feature 50 described above, however, the orientation of the surfaces 56, 52 and 60 is reversed. In general, each of the locking features 50a comprises a hook or bulbous end (as did feature 50), which faces outward relatively to a corresponding tab. Module 20a additionally includes a retaining ring 150 and air bag (not shown) of substantially the same design as the retaining ring and air bag illustrated above. As can be appreciated, the inner surface of the retaining ring in contact with the air bag can be flat as opposed to cup-shaped.

The first support member 200b is plate-like and replaces the open-ended slots 214 and ribs 210 of support member 200 with enclosed openings 514 formed in conjunction by the introduction of a peripheral rim 516. As illustrated, support member 200b includes two sets of oppositely situated openings 514, however, each major opening 314 can, if desired, be subdivided into smaller openings by using separation ribs 261 (not shown) in the manner used in FIG. 8 (for the outer support member 250a). First or inner support member 200b additionally includes the central opening 204, as well as the plurality of mounting openings 203. The dimensions (length and width) of each opening 514 and the placement of each pair of opposing openings 514 are chosen to fit about corresponding locking features 50a, without moving any locking feature 50a and tab 48 from its rest position. To achieve this placement, the spacing between opposing sets of openings 514 is sufficient to enable member 200b to be seated upon the cover with each of the respective four locking features 50a passing through a corresponding opening 514.

The second or outer support member 250d also comprises another steel plate having a flat body 251 with a central opening 254 and a plurality of mounting openings 253. The support member 250d includes a plurality of upturned shoulders or tabs 276, the underside of each shoulder or tabs 276 defining an engagement surface 278.

Reference is briefly made to FIG. 18, which is a partial sectional view showing the inner support member 200a in place on the cover 30a (not shown) about a single locking feature 50a, in this orientation the member 200a is horizontally supported by the cover. As mentioned above, in this orientation each tab 48 and locking feature 50a are in their respective rest or non-deflected condition. The outer support member 250d is shown in alignment with locking feature 50a and temporarily spaced apart from member 200a. Subsequently, support member 250d is moved downwardly and seated upon the cover 30a. During this process, surface 287 engages surface 56 of each lock feature 50a and urges the locking features 50a outwardly (see arrow 510) causing each respective tab 48 and locking feature 50a to move outwardly into a covering relationship with regard to the inner support member 200a to achieve a locked or engaged orientation as shown in FIG. 19.

Subsequently, an inflator such as 300 (shown in FIG. 1) is mounted upon support member 250d and onto the threaded fasteners 152 whereupon the inflator and the mounting members 200a and 250d are securely fastened to the retaining ring 150. As the various parts are tightened together the engagement surface 278 continues to urge each respective locking feature 50a radially outward into its assembled and locked position.

Many changes and modifications in the above-described embodiment of the invention can, of course, be carried out without departing from the scope thereof. For example, the locking features on the cover can include a combination of locking features some of which are movable outwardly upon contact with the second support plate and others movable inwardly upon contact with other portions of the second support plate. Accordingly, that scope is intended to be limited only by the scope of the appended claims.

The invention claimed is:

1. An air bag module (2) comprising: an inflator (300), a first plate-like member (200, 200a), a second plate-like member (250, 250a-d) and a cover (30) for enclosing an air bag;

the cover including a plurality of resilient tabs (48,50) spaced about the cover, each tab including a lock feature (50), each tab is movable from a rest position to a deflected position by one of the plates;

the first plate-like member (200-200a) is operatively connected to the cover and having a plurality of blocking surfaces (215) thereon, each blocking surface configured to be positioned adjacent a first surface of a corresponding tab with the tab in its rest position;

the second plate-like member (250a-d) has a plurality of engagement surfaces (272, 276) thereon for engaging a corresponding cam (56) surface of the lock feature (50) of the tab causing the lock feature to move over an adjacent blocking surface (215) of the first plate-like member, the second plate-like member sandwiching each lock feature between a corresponding engagement surface and the blocking surface of the first plate-like member.

2. The module as defined in claim 1 wherein the first plate-like member (200-200a) is configured to be moved relative to the cover without moving any tab from its rest position.

3. An air bag module (20, 20a) comprising: an inflator (300), a first support member (200, 200a), a second support member (250, 250a-250d) and a cover (30) for enclosing an air bag (100);

the cover includes a plurality of resilient tabs (48), the tabs are situated in a predetermined pattern about a cavity (38) which receives the air bag (100), a formation having a thickened tip is formed on a distal end of each tab, the thickened tip is configured as lock feature (50) which prevents the cover from disengaging from the first and second support members, each tab and associated lock feature is movable from a rest position to a deflected position upon contact with one of the plates;

the first and second support members are locateable about each tab and configured to cooperatively define an effective narrow opening which is of smaller dimension than the thick tip, thereby preventing movement of the thick tip through the first and second support members and hence the disengagement of the cover from the first and second support members;

wherein the first support member (200-200a) is configured to be placed upon the cover without moving the tab from its rest position, and wherein the second support member (250, 250a-d) is configured to engage each locking feature to move each tab and locking feature from its respective rest position.

4. The module as defined in claim 2 wherein each locking feature (50) includes an engagement surface (52) that is apart from the first support member at times when each tab is in its respective rest position.

5. The module as defined in claim 4 wherein the first engagement surface (52) is configured to be moved into a locking position upon contact of the second support member with a respective locking feature.

6. The module as defined in claim 3 wherein the locking feature is configured to move in one of a first direction and a second opposite direction.

7. The module as defined in claim 6 wherein the locking feature is configured to move in one of an inward or outward direction.

8. An air bag module (20, 20a) comprising: an inflator (300), a first support member (200, 200a), a second support member (250, 250a-250d) and a cover (30) for enclosing an air bag (100);

the cover includes a plurality of resilient tabs (48), the tabs are situated in a predetermined pattern about a cavity (38) which receives the air bag (100), a formation having a thickened tip is formed on a distal end of each tab, the thickened tip is configured as lock feature (50) which prevents the cover from disengaging from the first and second support members, each tab and associated lock feature is movable from a rest position to a deflected position upon contact with one of the plates;

the first and second support members are locateable about each tab and configured to cooperatively define an effective narrow opening which is of smaller dimension than the thick tip, thereby preventing movement of the thick tip through the first and second support members and hence the disengagement of the cover from the first and second support members;

wherein the locking feature is configured to move in one of a first direction and a second opposite direction.

9. The module as defined in claim 8 wherein the locking feature is configured to move in one of an inward or outward direction.

10. An air bag module (2) comprising:

an inflator (300), a first plate-like member (200, 200a), a second plate-like member (250, 250a-d) and a cover (30) for enclosing an air bag;

each of the first plate-like member and the second plate-like member has a center portion and when in an assembled configuration both center portions nest with each other;

the cover including a plurality of resilient tabs (48,50) spaced about the cover, each tab including a lock feature (50), each tab is movable from a rest position to a deflected position by one of the plates;

the first plate-like member (200-200a) is operatively connected to the cover and having a plurality of blocking surfaces (215) thereon, each blocking surface configured to be positionable adjacent a surface of a corresponding tab with the tab in its rest position;

the second plate-like member (250a-d) has a plurality of engagement surfaces (272, 276) thereon for engaging a corresponding cam (56) surface of the lock feature (50) of the tab for urging the lock feature from its rest position onto the first plate-like member into engagement with a corresponding blocking surface (215), the second plate-like member sandwiching each lock feature between a corresponding engagement surface and a blocking surface of the first plate-like member.

11. The module according to claim 10 wherein the center portions of each member are one of concave and flat.

12. The module according to claim 10 wherein the first plate-like member includes about its periphery one of an opening or slots through which one or more lock features are movable therethrough.

13. The module according to claim 12 wherein each of the slots includes a thin separator to divide a larger slot into a plurality of smaller slots each for receiving one lock feature.

14. The module according to claim 10 wherein the engagement surface of the second plate-like member is an angled surface for engaging a portion of at least one lock feature and for moving the lock feature radially outward into operative engagement with a blocking surface.

15. The module according to claim 10 wherein the cam surface of the tab is an angled surface and wherein the engagement surface is also angled at generally the same angle as the cam surface.

16. The module according to claim 10 wherein the second plate-like member includes at least one opening configured to receive a lock feature that extends through the first plate-like member, wherein an outer edge of the at least one opening is configured to engage the cam surface of at least one lock feature to move the lock feature radially into operative engagement with a blocking surface.

17. An air bag module (2) comprising: an inflator (300), a first support member (200, 200a), a second support member (250, 250a-d) and a cover (30) for enclosing an air bag;

the cover including a plurality of resilient tabs (48,50) spaced about the cover, each tab including a lock feature (50) at a distal end of each tab, each tab is movable from a rest position to a deflected position by one of the plates;

the first support member (200-200a) includes a number of slots or openings located in a region of the first support member about or near or at its edges, a portion of the first support member adjacent each slot or opening defines a blocking surface, each tab when in the deflected position is positioned over a corresponding blocking surface;

the second support member (250a-d) has a plurality of engagement surfaces (272, 276) thereon for engaging a corresponding cam (56) surface of the lock feature (50) of the tab and for moving the tab to its deflected position, the second support member sandwiching each lock feature between a corresponding engagement surface and the first support member.

18. The module according to claim 17 wherein the dimension of the slots and openings in the first support member permits the relative passage of the tabs through a corresponding slot or opening without moving the tabs from their rest position.

19. The module according to claim 17 wherein the slots or openings in the first support member are located in a generally planar region of the first support member.

20. The module according to claim 17 wherein the engagement surfaces are located in a generally planar region of the second support member.

21. The module according to claim 17 wherein the first support member and the second support member are configured as plate-like in construction.

* * * * *